April 3, 1928.  1,664,765
C. S. ASH
WHEEL STRUCTURE
Filed Aug. 30, 1923  2 Sheets-Sheet 1
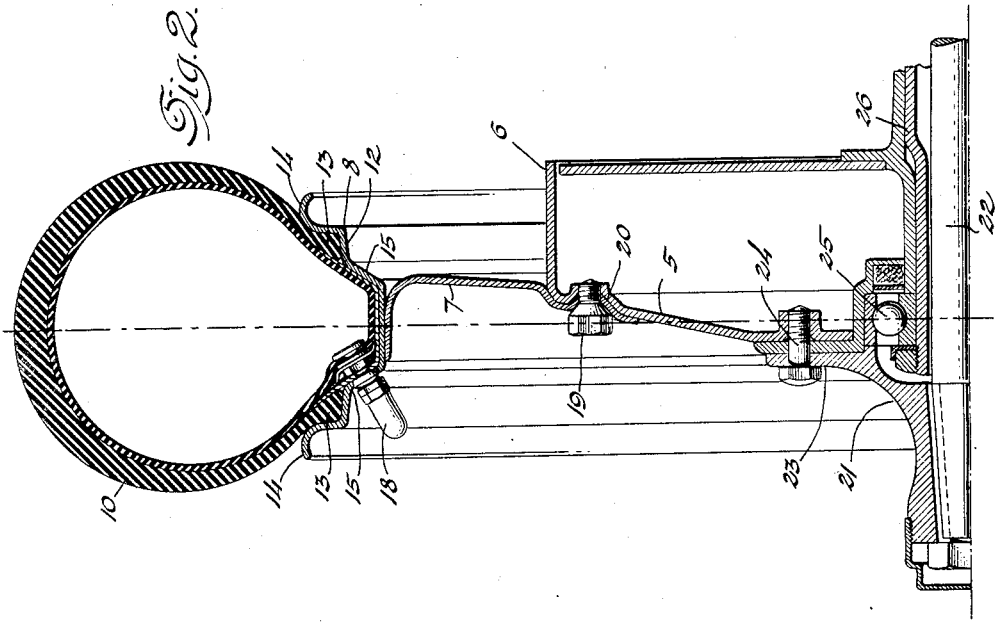
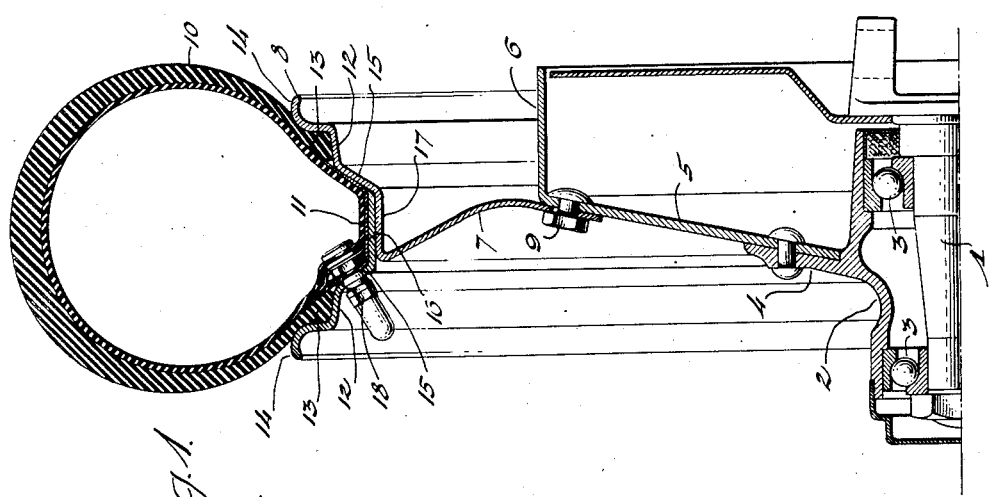
Inventor
Charles S. Ash
By
Attorneys

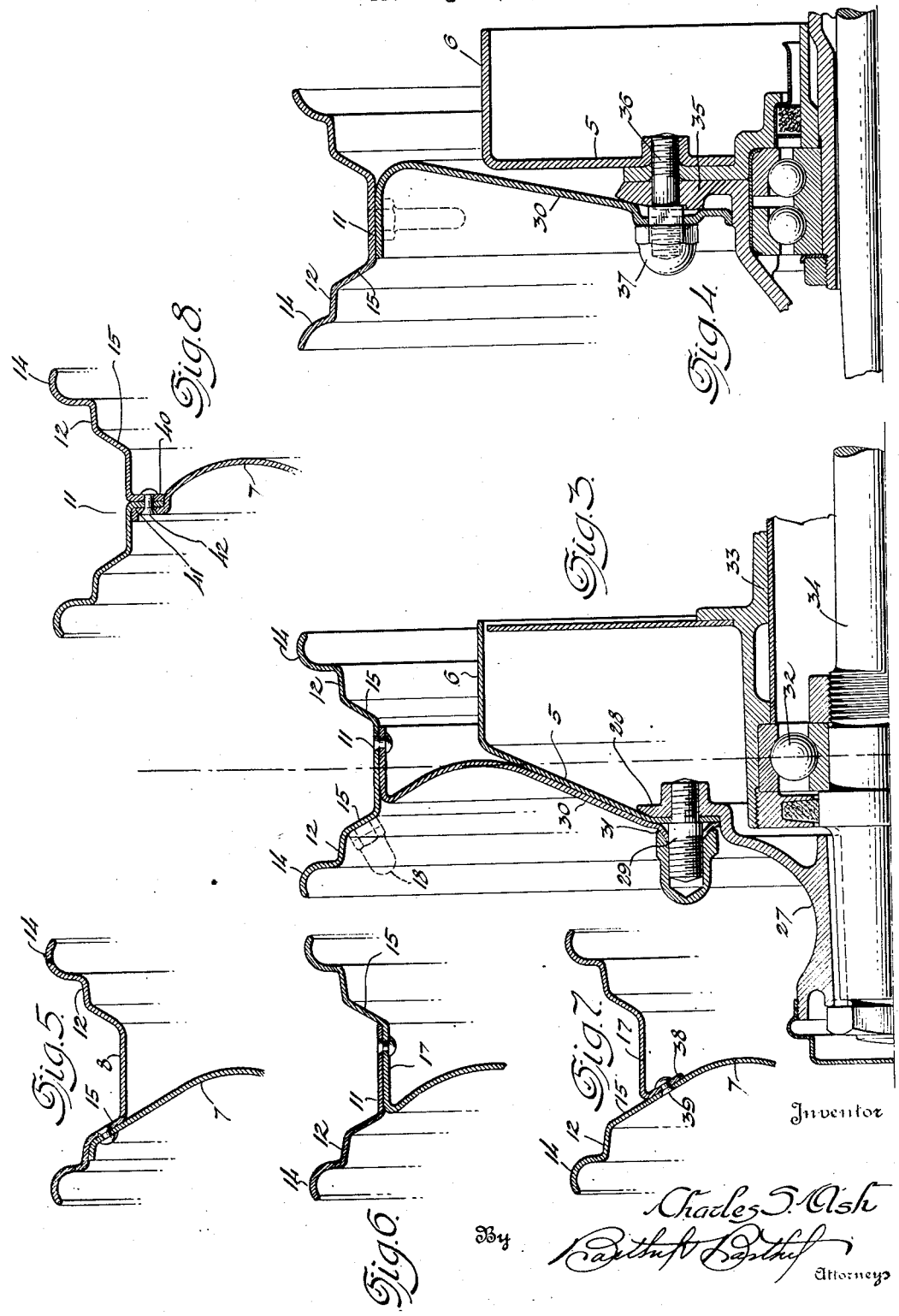

Patented Apr. 3, 1928.

1,664,765

UNITED STATES PATENT OFFICE.

CHARLES S. ASH, OF ROYAL OAK, MICHIGAN.

WHEEL STRUCTURE.

Application filed August 30, 1923. Serial No. 660,079.

The common practice has been to construct wheel rims for motor vehicles, with detachable side flanges or rims and the like so that tires having inextensible beads may be readily removed from the rims, and rims have also been made with integral side flanges, but in order to demount a tire from such a rim, it is necessary to stretch the beads. The present tendency seems to be toward tires of large cross sectional area as compared with wheel diameter, or what has been termed "balloon" tires, and the construction and arrangement of rims embodying the present invention is particularly adaptable for use in connection with such tires and with wheels of the disk type whereby a lighter, cheaper and more durable construction is secured, and whereby facility in demounting the tires from the rims, accessibility of tire valves, and simplicity of construction with elimination of all joints or loose parts, is secured.

As commonly arranged, the valve stem of the inner tire tube extends radially inward through an opening in the inner wall of the rim, and in disk wheel constructions, this stem often projects through the rim at the inner side of the wheel disk, due to the curvature of the disk, thus necessitating an angle stem and an opening therefor in the disk in order that easy access may be had to the stem. An object of the present invention is to obviate the necessity for angle stems by the employment of a form of rim which not only provides for quick demounting of the tire without the necessity for detachable holding means, but also provides for a convenient arrangement of straight valve stem regardless of the configuration of the wheel disk or the manner in which the rim is carried thereby.

A further object of the present invention is to combine a rim structure having no detachable parts or joints, with a disk portion so as to secure a maximum of strength with a minimum of weight and simplicity and cheapness of construction, and further, to provide a wheel construction particularly adaptable for four-wheel brakes with the wheels demountable and interchangeable.

It is also an object of the present invention to further reduce the cost of manufacture and weight of wheel structures by utilizing the brake drum as a disk or web part of the wheel, the rim being connected to, carried by and demountable from the drum, the drum thus taking the load and driving and torsional strains, making the structure particularly adaptable to four-wheel brake constructions.

It is also an object to provide a rim construction for disk wheels which lends itself particularly to the formation of rim and disk portions as a unitary structure with a rim portion an integral part of the disk portion, to give strength and simplicity to the structure and reduce weight and manufacturing costs, and also to make the structure particularly applicable to a brake drum when the drum is employed as a disk portion, whereby the demountable structure may be applied to drums of either the front or rear wheels of a four-wheel brake structure.

The use of tires of large cross-sectional area necessitates a reduction in rim diameter to give the desired over-all wheel diameter, and in the present invention, where it is proposed to utilize the brake drum as a disk portion, the rim may be demountably connected directly to the drum or attached thereto by means of an annular rim flange or other means extending inwardly to meet the drum, such mounting being permissible in view of the fact that a tire of large cross section is mainly relied upon for resiliency to absorb road shocks and jars, the object of such constructions being to simplify present demountable wheel structures and provide a demountable tire carrying part which is light in weight as compared with the present disk or spoke wheels demountable from the hub, and is of simple construction, strong and durable and may be quickly and easily mounted or demounted.

It is also an object, to provide a construction, arrangement and combination of elements whereby certain other new and useful features are secured, all as hereinafter more fully described.

With the above and other ends in view, the invention consists in the matters hereinafter set forth and more particularly pointed out in the appended claims, reference being had to the accompanying drawings, in which Figure 1 is a transverse vertical section through the upper half of the wheel and hub structure illustrative of an embodiment of features of the invention and showing the same as applied to a front or steering wheel of a vehicle;

Fig. 2 is a similar view showing a slightly modified construction and as applied to a rear or driving wheel of a vehicle;

Fig. 3 is a transverse vertical section through the upper half of a wheel and its hub structure and illustrating further modifications in which the brake drum and wheel disk are attached to the same hub flange with the disk demountable therefrom and supported by the drum;

Fig. 4 is a view similar to Fig. 3 and illustrative of a modified form;

Figs. 5, 6, 7 and 8 are sectional details illustrative of various forms of rim and disk-portion formations.

In all motor vehicle constructions which include brake mechanism for the four-wheels of the vehicle, a brake drum is a necessary element of each wheel, and the present invention contemplates the utilization of this drum as a connecting or web portion between the hub and rim, the drum wall then taking the load and driving strains as well as the braking strains. Such embodiment is shown in Fig. 1 of the drawings, in which embodiment, 1 indicates a stub or pivoted axle shaft upon which the wheel hub 2 is mounted with ball bearings 3 interposed between the hub and the stub shaft. A single annular flange 4 is provided on the hub, and to this flange is secured in any suitable manner, the radial or outwardly extending wall 5 of the brake drum 6, said wall being preferably dished or inclined to a vertical plane to give the wheel the desired appearance and strength, and bring said wall within the vertical load plane of the wheel, so that it may serve as a disk or web portion for the wheel and provide a proper support or place of attachment for an inwardly extending annular flange 7 on the wheel rim 8. This flange is preferably curved laterally or dished to complete the dished appearance of the disk or web portion of the wheel and to lend resiliency thereto. The flange is shown as secured to the drum wall by bolts 9, but any suitable fastening means may be employed, preferably means which will permit of the demounting of the rim from the flange of the drum. As the four-wheels of the vehicle will preferably be provided with drums of the same diameter, the rims will be interchangeable and particularly where tires 10 of large cross-sectional area as compared to their diameter are employed, the flange will be comparatively narrow, thus providing a demountable structure which is very light in weight and easy to handle. This construction provides a demountable structure of minimum weight with a maximum of strength and simplicity of construction, greatly reducing the cost of manufacture and providing a wheel structure in which the drum performs the double function of brake drum and disk portion, taking the load, driving and lateral strains, as well as braking strains. Drums are necessarily of sufficient strength to withstand these added strains and therefore may well be utilized as a disk portion, particularly in four-wheel brake constructions and where "balloon" tires are used, as such tires are mainly relied upon to give wheel resiliency, and the particular combination provides a wheel having all of the necessary qualities of a demountable disk wheel as commonly constructed, with the added advantages above set forth.

The construction of rim which is indicated as a whole by the numeral 8 and shown in Fig. 1, is particularly adapted for use in connection with "balloon" tires and disk wheel structures, this rim being formed with a central annular depression or channel 11 and a seat 12 at each side of this channel, for the inexpansible beads 13 along the edges of the tire casing 10, said beads being retained in their seats by side flanges 14 formed integral with the wall which forms the seat 12. This rim therefore is devoid of loose or detachable tire retaining or other members, and in order to demount the tire which is of comparatively large cross sectional area and has a thin casing wall, is first completely deflated so that the beads 13 may be pressed inwardly into the channel 11 of the rim, when the tire may then be placed eccentric to the rim with the beads within the channel at one side of the rim, and the beads at the other side of the rim free from the rim so that they may be forced laterally over the rim flanges 14 and the tire thus quickly and easily removed without the necessity for providing detachable side holding rings or other means commonly provided for holding straight side tire casings in place. The rim is therefore a unitary structure devoid of loose or detachable parts and is light in weight and cheap to manufacture.

A further advantage of this rim construction is that one wall or side of the rim, as shown in Fig. 1, may be formed integral with the flange 7 which forms a disk portion of the wheel, the rim flange 14, seat 12, inclined wall 15 of one side of the channel 11, and the flange 7 being all formed from a single sheet of metal, thus greatly reducing the cost of manufacture and providing a very strong structure of minimum weight. The opposite wall of the rim is also formed from a single sheet metal blank with the rim flange 14, seat 12, inclined wall 15 and bottom wall of the channel 11, all formed in a single operation, and the ring thus provided, being then secured to the opposite formed part by engaging the bottom wall 16 of the channel over the horizontally formed portion 17 of the opposed part and securing these walls 16 and 17 together by welding, or in any other suitable manner. A unitary structure comprising a complete rim and integral disk portion may thus be expeditiously formed and will be of minimum weight with a maximum of strength.

Rims as ordinarily constructed are provided with an opening in the bottom wall thereof to receive the valve stem of the inflatable inner tube of the tire but as these stems extend radially inward, where the disk portion of the wheel is dished inwardly, this stem extends inward at the inner side of the disk where it is inaccessible. To overcome this difficulty, it has been the common practice to provide an angle valve stem and to form the disk portion with an opening for the angularly extending end of the stem so that the outer end of the stem will extend through to the outer side of the disk. Where angle valve stems are used, it is necessary to use precaution in mounting the tire so that the stem will extend laterally in a direction to project through the opening in the disk, and a tire having a straight valve stem is much easier to mount upon its rim, than one provided with an angular stem.

A feature of the present invention is the providing of a rim having the central channel 11, which channel provides inwardly extending side walls 15 beyond the seats for the casing beads and therefore by providing an opening in one of these walls 15, the valve stem which is indicated as a whole at 18, may be extended through this opening, thus bringing the stem outside of the disk portion of the wheel and a straight valve stem may be used. As the wall 15 is inclined to the central load plane of the wheel, the valve stem when secured in place in an opening in this wall will assume an inwardly inclined position relative to the axis of the wheel and will project outwardly from the rim and beneath or within the plane of the seat and flange portions of the rim where it is readily accessible.

By combining, as shown in Fig. 1, a rim of the particular construction shown, with a disk portion, in a disk wheel structure, a structure is secured which comprises a minimum number of parts, is of minimum weight, and the cost of manufacture is also reduced to the minimum, and further, the construction provides for the use of a straight valve stem in disk wheel structures.

In Fig. 2 of the drawings, a structure is shown embodying modifications of the structure shown in Fig. 1, in that the flange 7 is formed from a single metal blank, separate from the rim, with the outer outturned edge portion of the flange welded, or otherwise secured to the bottom wall of the channel 11 of the rim, and this rim as shown in Fig. 2, is formed entirely from a single blank of metal, both side flanges 14, seats 12, walls 15 and bottom wall 16 of the channel being integral.

A further modification consists in the means for securing the flange 7 to the drum 6, the wall 5 of the drum being formed with an opening to receive a screwthreaded bolt 19 with a depression or concavity around the opening, and a corresponding conical projection 20 around the bolt opening in the flange, the head of the bolt being formed conical at its underside to engage the conical depression in the flange so that when the flange is secured in place by the bolt 19, the conical projection 20 on the flange fits into the depression on the drum wall and is firmly clamped therein by the conical head of the bolt, so that the bolt will be relieved of driving strains which would otherwise tend to shear the bolt, and these strains are taken by the projections 20 on the flange engaging the depression in the drum wall.

In Fig. 2, the wheel structure is shown as applied to a rear or driving wheel of a vehicle, the hub 21 being keyed to the end of a live or driving axle 22, and the drum being secured to a flange 23 on the hub by means of bolts 24 passing through this flange and engaging screwthreaded openings in the wall 5 of the drum. By securing the drum wall directly to the hub flange and inclining this wall, it crosses the vertical load plane of the wheel and brings the load plane in the plane of the anti-friction bearing 25 which is interposed between the hub and the end of the axle casing 26.

In Figs. 3 and 4 the same rim formation is employed as in the construction shown in Fig. 2, but in Fig. 4 the disk portion instead of being secured to the brake drum is extended to the hub and detachably secured to the hub flange for demounting from the hub in the usual manner. In Fig. 3, the live or driving axle 34 is supported by the bearing 32 within the dead axle or casing 33 with its outer tapered end portion projecting beyond the end of the casing, and the wheel proper is mounted upon this outwardly projecting end by means of a casting providing a sleeve portion 27 to fit the axle end and an outwardly extending flange or drum part 28 to which the wall 5 of the drum proper is secured by a shouldered and screwthreaded stud 29 with the disk or web portion 30 of the wheel lying flat against and supported by the said wall 5. A nut on the outer end of said stud has a conically recessed end to receive a conical formation 31 around the opening in the disk portion to securely and detachably clamp the disk in place, it being understood that a plurality of such studs and nuts, not shown, are provided at spaced intervals along the flange. As the member 27 is secured to the end of the live axle independent of the bearing 32 and end of fixed axle 33, and as the drum wall 5 is secured to the flange 28 of this member, said flange is in effect a continuation of said wall, and as the disk portion 30 is also demountably secured to said flange, said flange becomes in effect a web or disk portion of the wheel, taking the load, driving and tortional strains. The demountable wheel structure is therefore mounted on the drum structure and may be removed independently thereof or therewith, the removal of the member 27 from the live axle also taking away the drum so that ready access may be had to the bearing 32 interposed between the dead axle or casing 33 and the live axle or drive shaft 34. In this Fig. 3 is illustrated the application of the combined rim structure and disk portion to a wheel structure in which the disk is demountable from the drum adjacent the hub, and in Fig. 4 a modification of such application is shown and wherein the disk portion 30 is detachably secured to a hub flange 35 and is unsupported by the drum which is mounted in the usual manner upon the hub, the wall 5 of the drum being secured against the inner side of the hub flange by means of stud bolts 36 having nuts 37 to engage the disk portion and detachably clamp the same to the hub flange.

Figs. 5, 6, 7 and 8 are sectional details of combined rim and disk portions, illustrating different methods of constructing the rim 8 and its flange or disk portion 7. In Fig. 5, the rim is formed complete from a single sheet metal blank and the flange 7 is secured thereto at its outer edge by extending the flange outwardly in contact with the outer surface of one wall 15 of the rim; and in Fig. 6 the same construction of rim and disk portion is shown as that disclosed in Fig. 1, with the exception that the walls 16 and 17 are shown as secured together by rivets. In Fig. 7, one side of the rim comprising the flange 14, seat 12 and channel wall 15, are formed integral with the disk portion 7, and the bottom wall 17 of the rim channel is flanged downwardly as at 38 and secured by rivets 39 to the flange wall 7. In Fig. 8, the rim comprises two separately formed parts of like cross section, each part being formed to provide a rim flange 14, a seat 12, a side wall 15 for the channel 11, and one-half of the bottom wall of said channel, each part being flanged downwardly as at 40 to provide meeting flanges at the longitudinal central plane of the channel, said flanges extending inwardly to provide a place of attachment for the disk portion 7 which has an edge flange 41 engaging the side of the flanges 40 and secured thereto in any suitable manner as by rivets 42.

In the several modifications are shown practical applications of the features of the present invention to different types of wheels and hub structures, but it is obvious that other structural forms may be modified to apply the present invention thereto, and such application is contemplated as falling within the scope of the appended claims.

Having thus fully described my invention, what I claim is:

1. In a disk wheel structure, the combination of a disk portion and a rim, said rim comprising a part formed integral with said disk portion and a part rigidly secured thereto, said parts together forming edge tire-retaining flanges and a seat adjacent each flange with an outwardly open and inwardly projecting annular channel between said seats.

2. A disk wheel structure comprising a disk portion formed with an integral tire retaining rim portion, a peripheral portion of said disk being offset laterally to provide a seat for a tire bead and then extended radially outward to provide a tire retaining flange, and an annular rim member providing a seat for a tire bead and a tire retaining flange at the side of the disk opposite the integral rim portion thereof, said rim member having an annular portion to engage the laterally offset portion of the integral rim portion and secured thereto.

3. A disk wheel structure comprising a disk portion provided with an integral annular rim portion formed by offsetting the metal at the outer portion of the disk to provide an annular wall parallel with the wheel axis and forming the bottom of a rim channel in the central load plane of the wheel, extending said wall outwardly to form one side of said channel, extending the wall from the channel side laterally to provide a seat for a tire bead and forming the edge portion of the metal into an outwardly extending tire retaining flange; and an annular rim member formed to provide a tire retaining flange and tire bead seat adjacent said flange with an inwardly extending portion forming a side wall of said channel and a portion parallel with the axis of the wheel to engage the bottom wall of the channel formed by the disk and secured thereto.

In testimony whereof I affix my signature.

CHARLES S. ASH.